Jan. 17, 1956 V. WILEY 2,731,556

TWO BUTTON ARRANGEMENT FOR SIGNAL SEEKING TYPE RADIO RECEIVERS

Filed March 9, 1953

INVENTOR
VERLIS WILEY
BY Michael Hertz
ATTORNEY

United States Patent Office 2,731,556
Patented Jan. 17, 1956

2,731,556

TWO BUTTON ARRANGEMENT FOR SIGNAL SEEKING TYPE RADIO RECEIVERS

Verlis Wiley, Kenmore, N. Y., assignor to Sylvania Electric Products Inc., a corporation of Massachusetts Application March 9, 1953, Serial No. 341,022

5 Claims. (Cl. 250—20)

This invention relates to a switching arrangement for a signal seeking receiver.

In receivers of this type, the tuning element is motor driven and scans the receiver spectrum repeatedly. When a signal of predetermined strength is received, the incoming signal itself actuates mechanism to shut off the motor drive, thus leaving the receiver tuned to the incoming signal. Examples of such receivers will be found in the patents to R. A. Gull, 2,506,869 and 2,572,926.

It is an object of this invention to provide a simple means for enabling an operator to select either stations which are "local" or stations which are both "local" and at a "distance" to be scanned. In this way it is possible for the operator to receive only the strongest broadcasting stations in his vicinity or he may receive, depending on his choice, all the stations that the receiver is normally capable of receiving.

It is a further object to enable the selection of strength of signal to be received and the initiation of a scanning cycle to be effected by one single operation.

It is a still further object of my invention to provide but two push button controls which will, by operation of either selected button initiate scanning operation and simultaneously change the sensitivity of the receiver.

Figure 1:
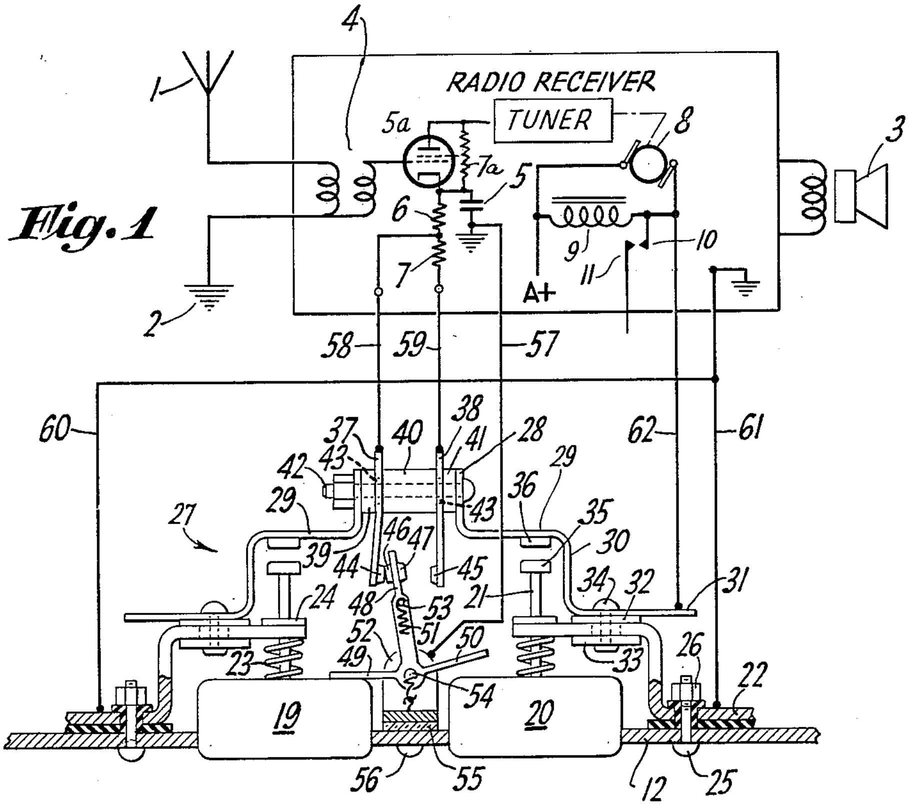
Figure 2:
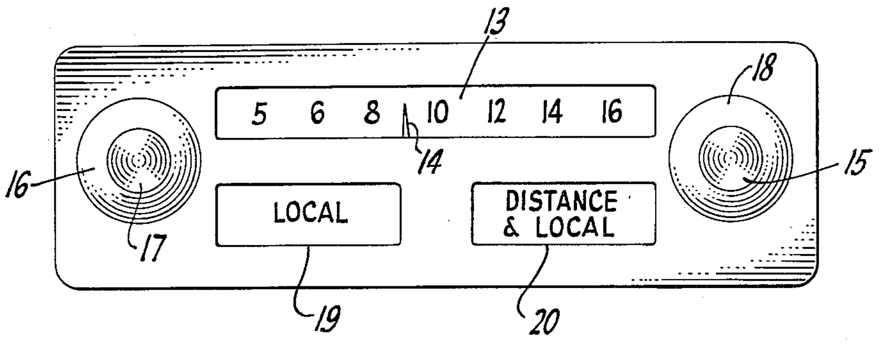

Other objects will be apparent after consideration of the following specification when taken in connection with the accompanying drawings in which Fig. 1 is a diagrammatic view of my invention with the push button controls and connections to the receiver shown prominently and Fig. 2 is a view of the front wall of a receiver incorporating the push button controls of Fig. 1.

The radio receiver of the signal seeking type is diagrammatically represented as having an input circuit including the antenna 1 and ground 2, as well as an output circuit in the form of a speaker 3.

Diagrammatically represented in the receiver is part of a first R. F. stage 4 having in the cathode circuit of the variable mu tube 5*a* a bypass condenser 5 and having two cathode grid bias resistors 6 and 7 in series with one another. Either the lower end of resistor 6 may be grounded to enable the receiver to have its normal sensitivity or the lower end of the resistor 7 may be grounded to increase the grid bias and therefore decrease the sensitivity of the receiver. A bleeder resistor 7*a* may be inserted between the anode and cathode of tube 5*a* so as to bias the tube near cut-off in order that the switch in resistance in the cathode circuit may be more effective in changing the sensitivity of the tube. The means for effecting this change in grid bias will be described shortly. The signal seeking receiver which may be of the superheterodyne type also has a motor 8 for changing the frequency response of the receiver as by tuning R. F. stages and changing the frequency of the oscillator in order to beat the signal to the I. F. of the receiver. The circuit to this motor is controlled by each of the push button controls which also energize a holding relay 9 having contacts 10 and 11. The contact 11 leads to a second relay armature, as illustrated at 29*a* in the patent to Gull 2,506,869 to provide a ground connection for the motor and relay coil independent of the manual controls. Sufficient structure has been illustrated here so that when taken in connection with the Gull patents it will be apparent that momentary operation of either of the push buttons will effect a tuning operation of the receiver, the motor running until a station at the desired threshhold of sensitivity is tuned in.

Mounted in the front wall 12 of the receiver housing is a conventional dial 13 and pointer 14, the pointer being moved either by the motor as it effects scanning of the spectrum or by operation of the manual station selector 15. The receiver may also incorporate a tone control 16 and a combined volume control and off-on switch 17 as is conventional in the art. The knob 18 is a dummy added for aesthetic reasons.

Located in the front wall is the push button 19 operable to initiate scanning of the spectrum to receive the next local station or strong signal only, and to eliminate reception of any distant station and the push button 20 is operable to initiate scanning of the spectrum to receive the next distant or weak signal station, or local station, whichever comes first after the push button 20 has been depressed and released. One advantage in providing this two-button control and the change in sensitivity is to eliminate, during the scanning of local stations, unnecessary whistles and howls of distant stations due in part to heterodyning action and unnecessary noises between stations.

Each of the push buttons controls both the sensitivity of the receiver and the scanning motor. Each of the push buttons has a conductive stem 21 slidably mounted in a conductive strap 22, a spring 23 urging a push button toward the operator and a stop 24 fixed on the stem limiting the outward movement of the button. Each of the straps is bent as indicated, forming two parallel legs through one of which the stem passes. The other leg is fastened to the front housing wall by bolts 25 and nuts 26.

Mounted on each leg through which a stem 21 slides is a bent supporting conductive strip 27. Each strip has a vertical portion 28, a horizontal portion 29 bent at an angle to the first vertical portion, another vertical portion 30 extending parallel to the first vertical portion and a second horizontal portion 31 offset from the first horizontal portion and parallel thereto, all the portions being arranged in generally zigzag formation. The mounting of each strip 27 is effected by positioning two insulating washers 32 and 33 against its strap 22 and passing a rivet through the conductive strip 27, washers 32 and 33 and a hole in the strap 22 and clinching the rivet so as to firmly clamp the parts.

The stems 21 and horizontal portions 29 carry cooperating contacts 35 and 36. Between the vertical portions 28 of the two strips is a contact carrying assemblage comprising a pair of leaf springs 37 and 38 and insulating blocks 39, 40 and 41. Block 40 is between the springs, while insulating blocks 39 and 41 are interposed between the springs and the strips 27. To hold all parts assembled and to electrically join the strips 27, a brass bolt and nut combination 42 has its head and nut engaging the two strips 27 while its shank passes through clearance holes 43 in the leaf springs.

The leaf springs carry contacts 44 and 45 respectively. Playing between these contacts is a pair of contacts 46 and 47 on a vertical contact arm forming a part of a triple armed bell crank lever of which the left hand arm is indicated as 49 and the right hand arm as 50. The bell crank lever is biased to over center position with either contacts 44, 46 closed or contacts 45, 47 closed by means of a snap over spring 51 fastened at one end to the base of a twin eared member 52 and at its other end to a pin 53 on the vertical arm of the triple armed bell crank lever. The lever is pivoted at 54 to the ears, the eared member itself, if desired, being suitably insulated from the base as by the use of an interposing fibre washer 55 and fastening bolt 56. The arms 49 and 50 overlie respectively the buttons 19 and 20.

The contacts 46 and 47 are grounded through the ears 52 by lead line 57. The spring leaf 37 is connected by lead line 58 to the junction between the two resistors 6 and 7, while the spring leaf 38 is connected to the lowermost end of resistor 7 by lead line 59.

The contacts 35 are connected by leads 60 and 61 to a suitable ground connection or negative side of an A battery while the contacts 36 are connected to the motor 8 and relay coil 9 and armature 10 as shown.

While I have shown a specific mode of changing the sensitivity of the set and a specific mode of starting the motor and maintaining the motor in operation, it should be understood that the invention is not dependent on how change in sensitivity is attained nor on how the motor is controlled, so long as these results are attained.

In operation, the momentary depression of "local" push button 19 will operate to throw over switch contact 47 onto contact 45, if the same be not already in contact, and by closure of left hand contacts 35, 36 start the motor 8 into scanning operator. The sensitivity of the receiver having been decreased, weak stations will be passed over and the motor will be stopped on the next strong station. Successive operations of push button 19 will bring in successive "local" or strong signal stations, only. Should the push button 20 be depressed momentarily, that single operation will effect throw-over of the contact 46 onto contact 44 to increase the sensitivity of the receiver and initiate operation of the scanning motor 8, until a suitable signal is received. Successive depressions of button 20 will bring in successively all stations capable of being received by the receiver.

Thus the operation of the receiver is made simple since only one button at any one time need be operated, whether the receiver is to receive strong signals only or both strong and weak signals.

Having thus described my invention, what I claim is:

1. In a signal seeking receiver having a motor effective to scan the spectrum and stop on a signal of more than a predetermined minimum strength, said receiver including a sensitivity control means having a plurality of portions corresponding to different sensitivities of the receiver, first and second means to control the motor, third means connected to a portion of said sensitivity control means, fourth means connected to a different portion of said sensitivity control means, and unicontrol means for simultaneously operating said first and third or second and fourth means.

2. In a signal seeking receiver having a motor effective to scan the spectrum and stop on a signal of more than a predetermined minimum strength, said receiver including a sensitivity control means having a plurality of portions corresponding to different sensitivities of the receiver, first and second means to control the motor, third means connected to a portion of said sensitivity control means, fourth means connected to a different portion of said sensitivity control means, unicontrol means for simultaneously operating said first and third or second and fourth means, said unicontrol means comprising a pair of manuals, one manual operating the first means and the second manual operating the second means, said third and fourth means including a bell crank lever with one arm overlying one of the manuals, a second arm in a position to overlie the other of the manuals after operation of the first manual and a third arm carrying contact means forming a portion of said third and fourth means.

3. In a signal seeking receiver having a motor effective to scan the spectrum and stop on a signal of more than a predetermined minimum strength and having means to change the sensitivity of the receiver, switch means to control the motor, second switch means having a plurality of positions and connected so that the sensitivity for one position is different from that in another, and independently operable manuals, each manual being capable of effecting the operation of both switch means, said first switch means comprising pairs of contacts in parallel circuit arrangement with one of each of a pair of contacts carried respectively by each of the manuals, said second switch means comprising a snap-over bell crank lever with one arm overlying one of the manuals, and the other arm in a position to overlie another of the manuals after operation of the first mentioned manual.

4. In a signal seeking receiver having a motor effective to scan the spectrum and stop on a signal of more than a predetermined minimum strength and having means including different portions effective to change the sensitivity of the receiver, switch means to control the motor, second switch means to select the sensitivity desired, and a pair of side by side independently operable push buttons each carrying a contact member connected to one line in the motor circuit, a second cooperating contact for each of the push button contacts connected to another line in the motor circuit, these contacts being effective to close the motor circuit so long as the contacts of a cooperating pair are closed, a triple armed bell crank lever interposed between said pushbuttons, one arm overlying one of the buttons and another arm being in position to overlie the other button upon operation of said first button, means biasing said bell crank lever to either of said positions, a third arm of said bell crank lever carrying contact means forming part of the sensitivity changing means circuit, separate contacts on opposite sides of said third arm in position to be contacted, one at a time, by said contact means, and line means separately connecting said separate contacts and the cooperating contact means with said different portions of the sensitivity changing means of the receiver.

5. A multiple switch comprising a pair of side by side independently operable push buttons each carrying a contact member, a second cooperating contact for each of the push button contacts, a triple armed bell crank lever interposed between said pushbuttons, one arm overlying one of the buttons and another arm being in position to overlie the other button upon operation of said first button, means biasing said bell crank lever to either of said positions, a third arm of said bell crank lever carrying contact means, and separate contacts on opposite sides of said third arm in position to be contacted, one at a time, by said contact means.

References Cited in the file of this patent

UNITED STATES PATENTS

| | | |
|---|---|---|
| 1,910,030 | Millermaster | May 23, 1933 |
| 2,523,786 | Soreng | Sept. 26, 1950 |
| 2,639,337 | Framheim | May 19, 1953 |
| 2,639,373 | Goodrich | May 19, 1953 |
| 2,652,494 | Guyton | Sept. 15, 1953 |
| 2,653,225 | Guyton | Sept. 22, 1953 |